(No Model.)
E. C. SMITH.
MACHINE FOR MANUFACTURING PLASTER BOARDS.
No. 529,535. Patented Nov. 20, 1894.
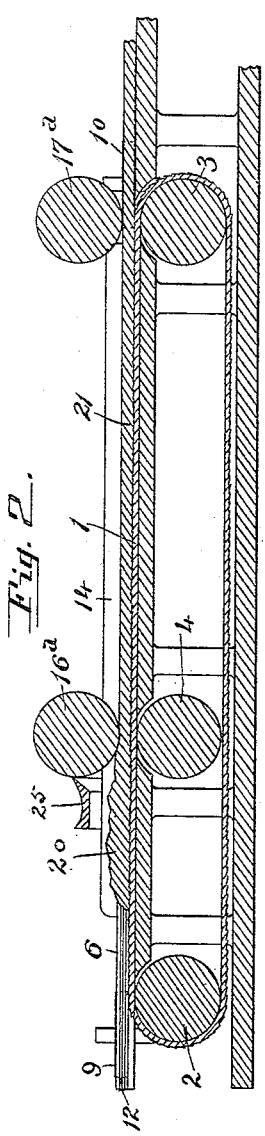
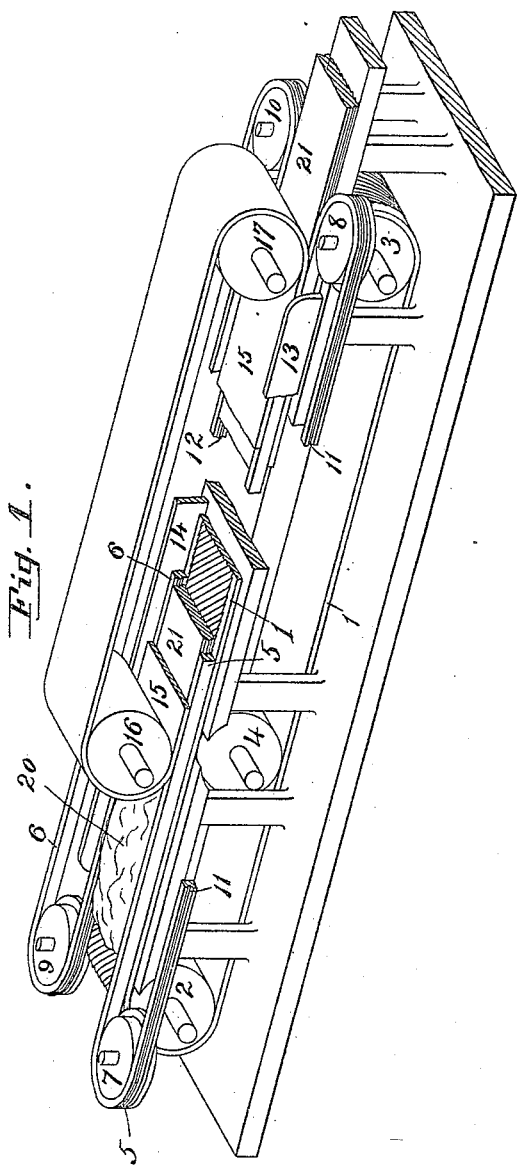
WITNESSES:
INVENTOR
Eugene C Smith
BY
D. Walter Brown
ATTORNEYS.
THE NORRIS PETERS CO., PHOTO-LITHO., WASHINGTON, D. C.

UNITED STATES PATENT OFFICE.

EUGENE C. SMITH, OF NEW YORK, N. Y.

MACHINE FOR MANUFACTURING PLASTER-BOARDS.

SPECIFICATION forming part of Letters Patent No. 529,535, dated November 20, 1894.

Application filed May 22, 1893. Serial No. 475,193. (No model.)

*To all whom it may concern:*

Be it known that I, EUGENE C. SMITH, a citizen of the United States, and a resident of New York, in the county of New York, State of New York, have invented a certain new and useful Improvement in Machines for Manufacturing Plaster-Boards, of which the following is a specification.

My invention relates to improvements in machines for manufacturing plaster boards, and particularly such boards as have no envelope to prevent them from sticking to the working parts of the machine. This liability of the materials of such boards to stick to the working parts of the machine, and in time to clog the machine, has heretofore prevented the use of machinery in the manufacture of the boards to any practicable extent, and has necessitated the almost exclusive employment of hand labor. I have, however, devised a machine to overcome this difficulty. My principle consists in making the working parts of the machine which shape the board continuous, flexible molds, which travel with the materials of the board until the latter has acquired considerable cohesiveness and strength, and then by reason of said flexibility strip off from the board, carrying away only a little of the plaster materials, which are readily scraped off the molds by the action of the machine itself. I believe this use of continuous flexible traveling molds in machines of the class to be new, and I regard it as the foundation of my invention.

In the drawings which accompany the specification as aids to the description, I illustrate two modifications of my machine.

Figure 1 shows in broken perspective, the preferred form of my machine, wherein the flexible continuous traveling molds form the bottom and sides of the plaster board, and there is a traveling apron between the pressure rolls and the plaster composition. Fig. 2 is a longitudinal vertical section of a modification of my machine, wherein pressure rolls work directly on the top of the composition, there being a scraper to remove the adhering particles of plaster composition from the rolls.

Referring to Fig. 1. 1 is a horizontal endless flexible mold for the bottom of the plaster board, made of rubber or other suitable material, having its inner surface that wraps the pulleys, 2, 3, and passes by the roll, 4, smooth, and its outer surface formed into configuration of ribs and grooves suitable for the desired surface of the board. Said mold 1, as well as the molds 5, 6, hereinafter referred to more particularly, must be made of imperforate material, so that the plaster composition cannot work into or through the interstices, for if the plaster enters the substance of the said molds it will be impossible to strip the molds from the board without injury to the latter. The aforesaid pulley, 3, may serve also as a roll to support the board against the pressure of an upper roll, as will be hereinafter explained. Along each edge of the mold, 1, is an endless vertical mold, 5 and 6, stretched around horizontal pulleys, 7, 8, and 9, 10, and said molds each being smooth on the inside, and one having a tongue, 11, the other a groove, 12, on the outside, when it is desired to "match" the edges of the board, or both said molds being smooth on the outside, if the edges of the board are to be smooth.

13, 14, are side boards to support the side molds, 5, 6, against the tendency of the plaster composition to spread laterally. The aforesaid pulleys, 2, 3, 7, 8, 9, 10, are supported in any suitable bearings on the frame of this machine, and one of the pulleys of each mold is driven in any suitable manner, so that all three of said molds, 1, 5, and 6, travel in the same direction at the same speed.

In my preferred form of machine, an apron, 15, of any suitable material, as rubber, and as wide as the mold, 1, is stretched parallel and over said mold on pulleys, 16, 17, which said pulleys also serve as pressure rolls, being arranged at a proper distance vertically over the rolls, 4 and 3, according to the thickness of the board and the width of the vertical molds, 5 and 6. The rolls, 4, 16 and 17, are supported in any suitable bearings in the frame of the machine, and are driven in any suitable manner, so that the apron, 15, and the upper periphery of the roll, 4, travel in the same direction and at the same speed as the molds, 1, 5 and 6.

The operation is as follows: The plaster composition, 20, which usually consists of anhydrous gypsum, water, and fibrous materials, is put on the mold, 1, between the molds, 5 and 6, behind the roll, 16, and, the machine being started, all three said molds advance at the same speed toward the roll, 16, and apron, 15. This roll, 16, in combination with the apron, 15, the mold, 1, and the roll, 4, presses the composition, forces it out against the side molds, 5 and 6, and causes it to conform to the grooves in the mold, 1, and to the tongue and groove in the side molds. When the board, 21, passes beyond the roll, 16, it is somewhat tenacious, and continues to harden somewhat until it reaches the roll, 17, which in combination with the apron, 15, the mold, 1, and the roll, 3, further presses and hardens the board, 21, which is now sufficiently firm to be pushed along on a platform at the end of the machine. Any suitable scrapers or brushes attached to the frame of the machine will clear the molds of the fragments of plaster composition. It will be understood, that, as the board is passed along, suitable quantities of plaster composition are added to the mold, 1.

In Fig. 2, the bottom mold, 1, side molds, 5 and 6, pulleys and rolls, 2, 3, 4, 7, 8, 9, 10, 16 and 17, and side boards, 13 and 14, are all constructed and arranged substantially as hereinbefore described; but the apron, 15, is dispensed with, and I arrange a pressure roll, 16$^a$, vertically over the roll, 4, and at a distance from said roll, 4, such that the space between the peripheries shall be equal to the thickness of the mold, 1, plus the width of the molds, 5 and 6. When it is desired to groove both surfaces of the board, the periphery of the roll, 16$^a$, will be grooved, and another roll, 17$^a$, may be employed together with the pulley or roll, 3, to bring additional pressure on the board, in order to spread the tongues formed by the roll 16$^a$, and to further harden the board. The roll, 17$^a$, may also be used to further compress the board when the roll, 16$^a$, is formed with a smooth periphery. The rolls, 16$^a$ and 17$^a$, will be driven in any suitable manner so that their peripheries where they come in contact with the board and the molds, 5 and 6, shall move in the same direction and at the same speed as the molds, 1, 5, and 6. A scraper, 25, may be arranged to remove the particles of plaster composition from the roll, 16$^a$.

The operation of this form of machine is evidently the same as hereinbefore explained, except that the rolls, 16$^a$ and 17$^a$, bear directly on the plaster composition and the board.

Now, having described my improvement, I claim as my invention—

In a machine for manufacturing plaster-boards, the combination of a bed to receive the plaster composition, an imperforate endless flexible traveling mold 1 adapted to carry forward and work the plaster composition, endless imperforate traveling side molds 5 and 6, traveling at the same speed as mold 1 and adapted to shape the sides of the board, and rollers, 2, 3, 7, 8, 9, 10, adapted to actuate said molds and transmit pressure to the plaster composition, substantially as described.

In testimony that I claim the foregoing as my invention I have signed my name, in presence of two witnesses, this 29th day of November, 1892.

EUGENE C. SMITH.

Witnesses:
MARIA E. FINLEY,
ARTHUR L. KENT.